(12) United States Patent
Inge et al.

(10) Patent No.: US 8,171,920 B2
(45) Date of Patent: May 8, 2012

(54) DEVICE FOR CLEANING CRANK CASE GASES

(75) Inventors: Claes Inge, Saltsjö-Duvnäs (SE); Peter Franzén, Huddinge (SE); Torgny Lagerstedt, Stockholm (SE); Johan Strömberg, Järfälla (SE)

(73) Assignee: 3nineAB, Nacka Strand (SE)

( * ) Notice: Subject to any disclaimer, the term of this patent is extended or adjusted under 35 U.S.C. 154(b) by 717 days.

(21) Appl. No.: 12/097,423

(22) PCT Filed: Nov. 22, 2006

(86) PCT No.: PCT/SE2006/050498
§ 371 (c)(1),
(2), (4) Date: Mar. 20, 2009

(87) PCT Pub. No.: WO2007/073320
PCT Pub. Date: Jun. 28, 2007

(65) Prior Publication Data
US 2009/0241920 A1    Oct. 1, 2009

(30) Foreign Application Priority Data

Dec. 20, 2005   (SE) ....................................... 0502821

(51) Int. Cl.
*F01M 13/04*    (2006.01)
(52) U.S. Cl. ....................................... 123/572
(58) Field of Classification Search .......... 123/572–574, 123/41.86
See application file for complete search history.

(56) References Cited

U.S. PATENT DOCUMENTS

| | | | |
|---|---|---|---|
| 4,920,930 A | 5/1990 | Sakano et al. | |
| 6,536,211 B1 | 3/2003 | Borgström et al. | |
| 6,755,896 B2 | 6/2004 | Szepessy et al. | |
| 6,783,571 B2 * | 8/2004 | Ekeroth | .............. 95/8 |
| 6,821,319 B1 | 11/2004 | Moberg et al. | |
| 6,860,915 B2 | 3/2005 | Stegmaier et al. | |
| 7,077,881 B2 | 7/2006 | Franzen et al. | |
| 7,152,589 B2 * | 12/2006 | Ekeroth et al. | ............... 123/572 |
| 2003/0024512 A1 * | 2/2003 | Kitano et al. | ................ 123/572 |
| 2004/0003579 A1 | 1/2004 | Stegmaier et al. | |

FOREIGN PATENT DOCUMENTS

| | | |
|---|---|---|
| DE | 3701587 | 11/1987 |
| DE | 4311906 A1 | 10/1994 |
| DE | 19700733 | 7/1998 |
| DE | 10350562 A1 | 6/2005 |
| EP | 1045117 A1 | 10/2000 |
| EP | 1555399 A2 | 7/2005 |
| JP | 2004-521237 | 7/2004 |

(Continued)

OTHER PUBLICATIONS

PCT Application No. PCT/SE2006/050498, International Search Report mailed Mar. 15, 2007, 4 pgs.

(Continued)

*Primary Examiner* — M. McMahon
(74) *Attorney, Agent, or Firm* — Mark P. Stone

(57) ABSTRACT

Device for cleaning crankcase gases from an internal combustion engine by means of a centrifugal separator (14), comprising a housing (16) with a rotor (22), which is rotatably supported in the housing and has a plurality of tightly separated separating discs (20). The housing (16) has an interface surface, which is designed for direct mounting of the housing (16) over a corresponding opening in a valve cover of the internal combustion engine.

13 Claims, 3 Drawing Sheets

FOREIGN PATENT DOCUMENTS

| | | |
|---|---|---|
| JP | 2005-515065 | 5/2005 |
| SE | 519180 | 1/2003 |
| SE | 526803 | 11/2005 |
| WO | WO-02/099256 A1 | 12/2002 |
| WO | WO-03/061838 A1 | 7/2003 |
| WO | WO-2004/024297 A1 | 3/2004 |

OTHER PUBLICATIONS

PCT Application No. PCT/SE2006/050498, Written Opinion mailed Mar. 15, 2007, 4 pgs.

"European Application Serial No. 06824567.9, Communication and Supplementary European Search Report mailed Feb. 16, 2009", 4 pgs.

"Japanese Application Serial No. P2008-547178, Notice of Reasons for Rejection dated Jan. 31, 2011", (English Translation), 3 pgs.

Haldex—Alfdex Oil Mist Separator.

\* cited by examiner

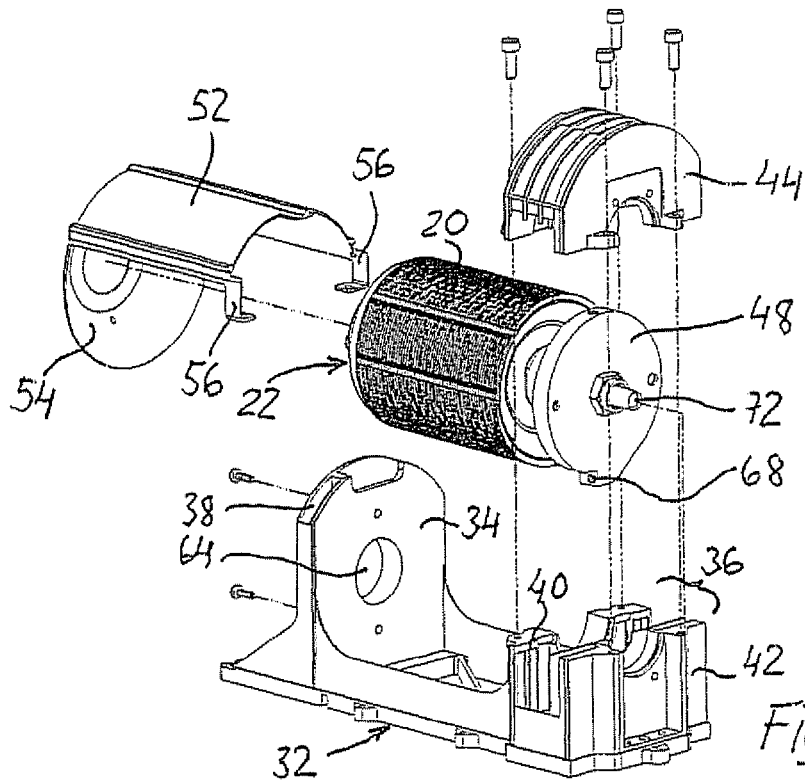
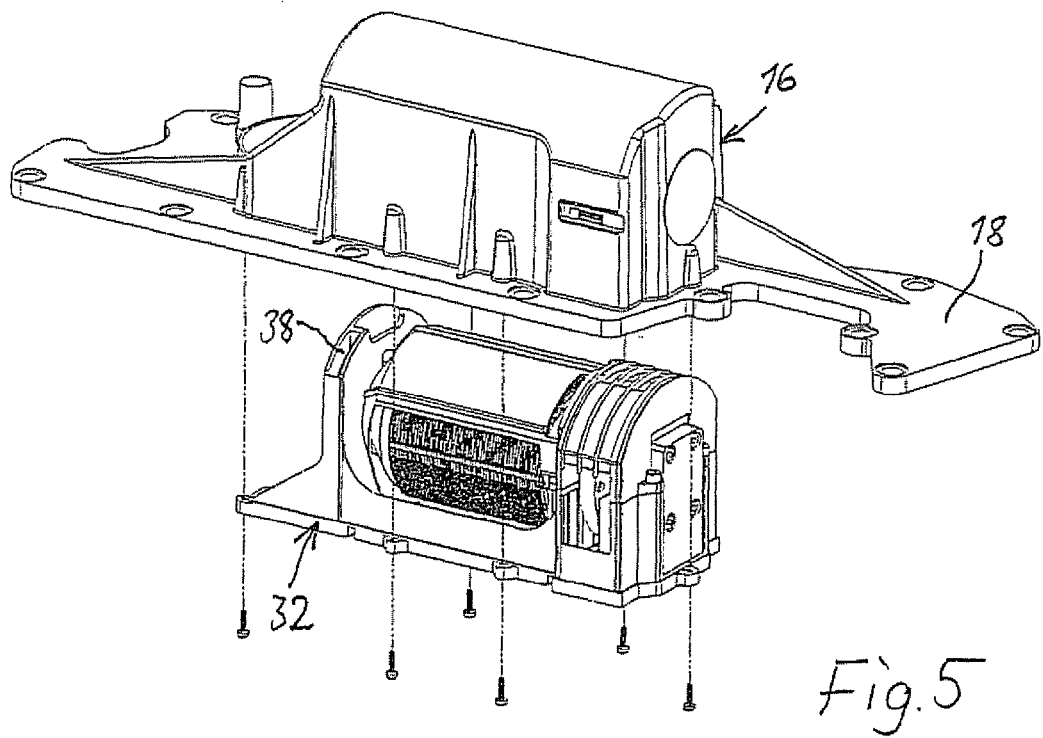

DEVICE FOR CLEANING CRANK CASE GASES

RELATED APPLICATIONS

This application is a nationalization under 35 U.S.C. 371 of PCT/SE2006/050498, filed Nov. 22, 2006 and published as WO 2007/073320 A1, on Jun. 28, 2007, which claimed priority under 35 U.S.C. 119 to Sweden Patent Application Serial No. 0502821-2, filed Dec. 20, 2005; which applications and publication are incorporated herein by reference and made a part hereof.

BACKGROUND OF THE INVENTION

1. Technical Field

The invention relates to a device for cleaning crankcase gases from an internal combustion engine by means of a centrifugal separator, the centrifugal separator comprising: a housing, a rotor arranged in the housing and having a plurality of tightly separated separating discs, which define a central gas flow shaft, which communicates with intervening spaces between the disc elements and with a cavity around the rotor defined by the housing; a drive device for rotation of the rotor; an inlet in the housing for crankcase gas; an outlet in the housing for cleaned crankcase gas; and an outlet in the housing for separated oil.

2. State of the Art

A device of the aforesaid type has previously been known in the form of the "Alfdex Oil Mist Separator" produced by Messrs. Haldex/Alfdex. This crankcase gas cleaner is designed for mounting on the side of the engine block of the internal combustion engine, which makes it necessary to run a separate, external feed line for the crankcase gas between the space enclosed by the valve cover, from whence the untreated crankcase gas normally derives, and the inlet on the housing of the centrifugal separator. This side mounting of the crankcase gas cleaner furthermore means that when starting the engine up in cold outdoor operating conditions it takes a relatively long time for the cleaner to reach optimum operating temperature, which may also require separate insulation of the components of the device, in order, among other things, to reduce the problem of condensation.

SUMMARY OF THE INVENTION

An object of the present invention is to propose a device for cleaning crankcase gases from an internal combustion engine by means of a centrifugal separator, in which no external line needs to be run for delivery of the crankcase gas to be cleaned, and in which the device is designed and arranged so that it can be rapidly heated up to a suitable operating temperature. To this end, the device according to the invention is characterized by the features specified in the independent claim 1. The housing therefore has an interface surface, which is designed for direct mounting of the housing on the valve cover of the internal combustion engine, in addition to which the gas inlet in the housing has a downstream opening, which communicates with a gas inlet chamber in the centrifugal separator, and an upstream opening, which is situated in the interface surface and which by way of an opening in the valve cover communicates directly with the crankcase gas in a space defined by the valve cover. The cleaning device can thereby be rapidly heated up to the required operating temperature directly by the hot crankcase gases.

Another object of the invention is to provide a gas cleaning device of modular construction in order to facilitate rapid assembly and mounting thereof on the valve cover of the engine. For this purpose, the rotor is rotatably supported in a separate frame, which can be inserted and fitted into the cavity in the housing.

A further object of the invention, where the rotor is made to rotate by means of a hydraulically driven turbine wheel, is to support this in a turbine housing, which is integrally formed with the frame and in which the turbine wheel can function unaffected by the outflow of oil separated out by the separator.

Further characteristic features and advantages of the device according to the present invention will be set forth in the following detailed description and in the dependent patent claims, referring to the drawings attached.

BRIEF DESCRIPTION OF THE DRAWINGS

FIG. 4 is an exploded, perspective view of the centrifugal separator without its housing;

FIG. 5 is an exploded, perspective view of the centrifugal separator, assembled to form an insertable unit, and the housing in which the unit is to be fitted.

DETAILED DESCRIPTION OF A PREFERRED EMBODIMENT

Figure 1:
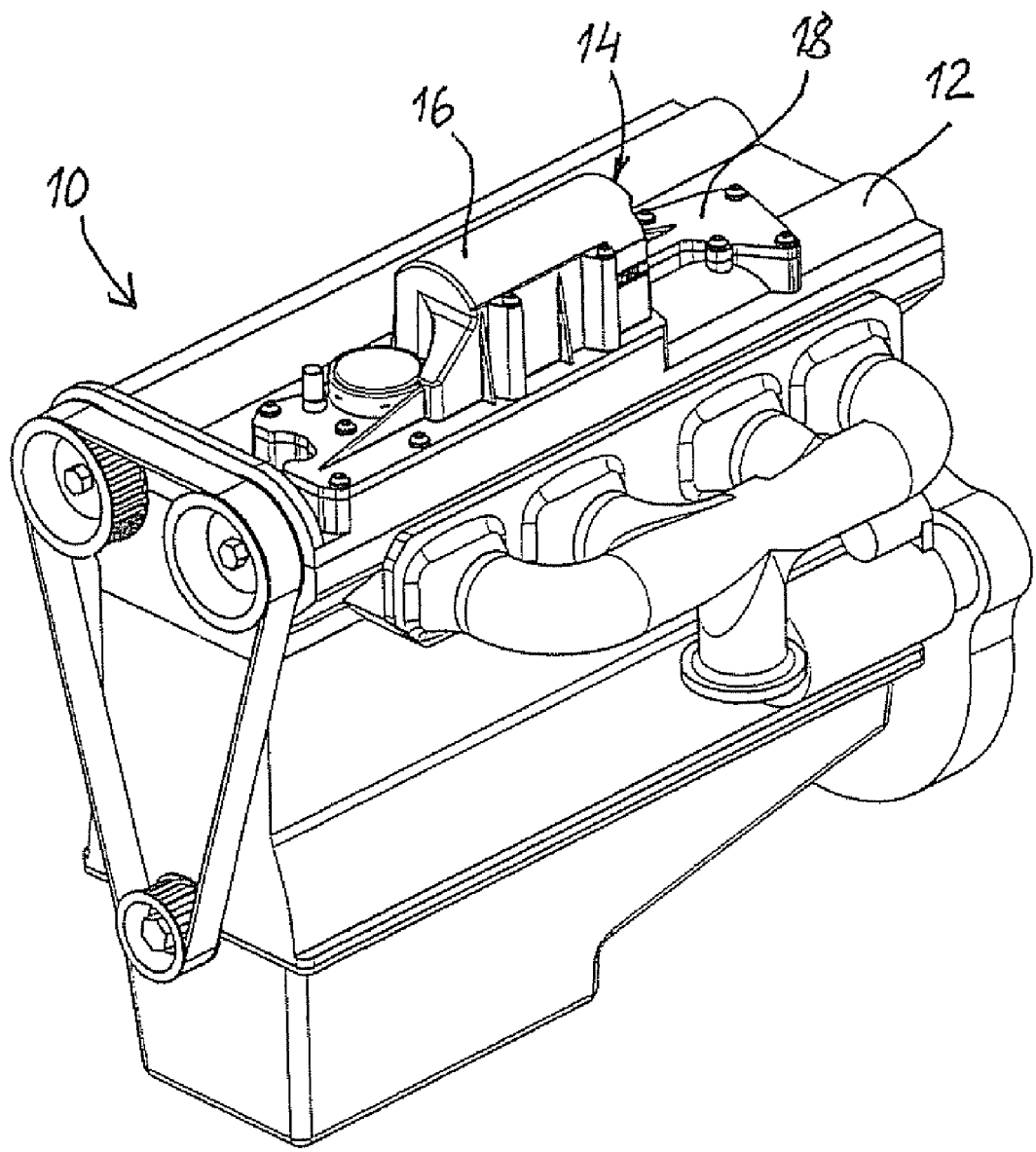
FIG. 1 is a schematic, perspective view of a cleaning device for crankcase gases according to the invention, mounted directly on a valve cover of an internal combustion engine.

In FIG. 1 a schematically represented internal combustion engine is generally denoted by 10, having a cleaning device 14 of centrifugal type according to the invention mounted directly on top of its valve cover 12 for cleaning the engine crankcase gases. The cleaning device 14 comprises a housing 16, which is integrally formed with a mounting plate 18 for fixing the housing 16 and components thereof enclosed therein to the valve cover 12. The housing 16 and the mounting plate 18 have an interface surface 19, which is configured according to the valve cover 12 in question and according to openings therein for the introduction of untreated crankcase gas into the housing 16 and for the discharge of cleaned crankcase gas, and for returning the oil separated out to the engine lubricating oil system via the valve housing.

The housing 16 is designed to enclose and support a rotor 22, which carries a plurality of separating discs 20. The separating discs 20 are of a truncated cone shape and are stacked tightly against one another with intervening flow ducts for the crankcase gas to be cleaned. The discs 20 are threaded onto a plurality of circumferentially separated, axially elongate centering rods 24 and define a central inlet shaft 26 for the crankcase gas to be cleaned. End discs 28, 30 hold the conical discs 20 clamped between them. The rotor 22 is supported in a separate frame 32 (FIG. 4), which has a first end piece 34 at one end and a second end piece 36 at the opposite end. The first end piece 34 defines a gas outlet duct 38 for cleaned crankcase gas, whilst the second end piece 36 has two separated wall sections 40, 42, which between them and together with a cover part 44 define a chamber 46 for accommodation of a turbine wheel 48 for rotation of the rotor 22. By means of its shaft 50, the rotor 22 is rotatably supported in wall sections 40, 42 of the end section 36 and the cover part 44.

Figure 2:
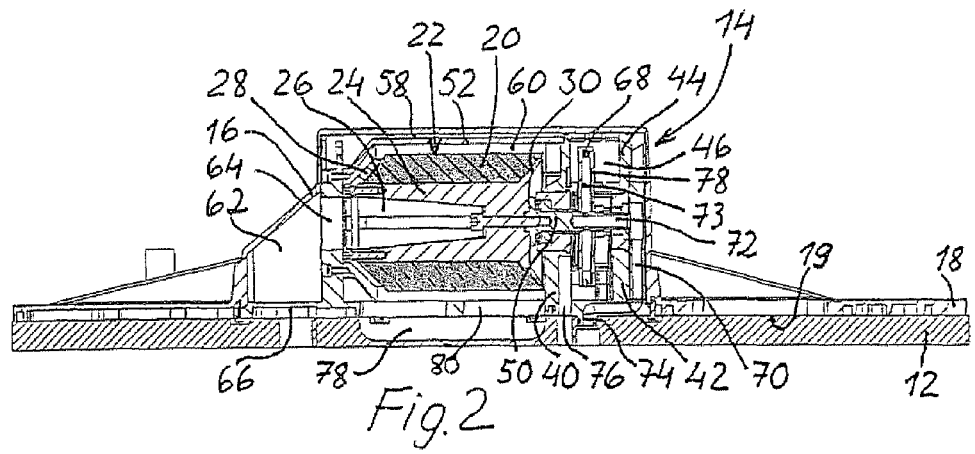
FIG. 2 is a longitudinal section along the line II-II through a housing in FIG. 3, with a centrifugal separator mounted therein.

As will be seen from FIGS. 2, 4 and 5, an essentially semi-cylindrical intermediate wall 52 is designed to enclose the outside of the rotor 22 at a distance on the side thereof remote from the valve cover 12. One end of the intermediate wall 52 is integrally formed with an end wall 54 in the form of a truncated cone, the center of which coincides with the central axis of the rotor 22, and which is fixed to the first end piece 34. The other end of the intermediate wall 52 has attachments 56 for fixing the intermediate wall 52 to the end piece 36. Between the outside of the intermediate wall 52 and the opposing inside of the housing 16 a space 58 is thereby created, which communicates with the gas outlet duct 38 in the first end piece 34 and which is shielded from a turbulent space 60 inside the intermediate wall 52. This also reduces the air friction for the rotor 22 as it rotates.

Figure 6:
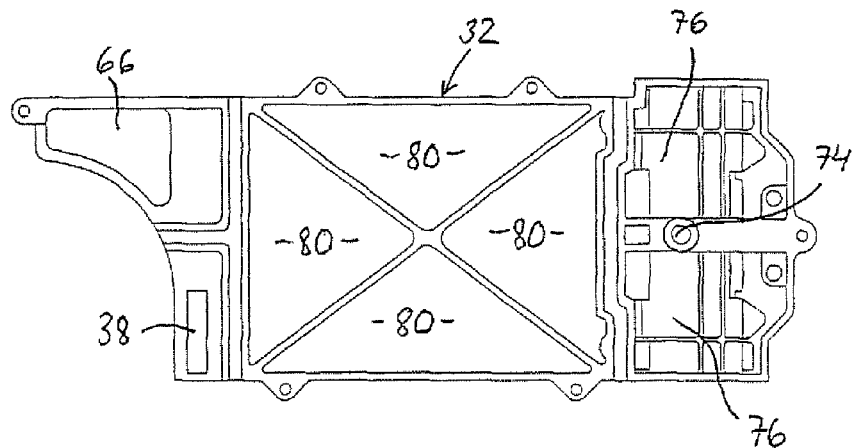
FIG. 6 is a plan view from below of the frame in which the rotor is to be mounted.

In the mounting plate 18 the housing 16 has an opening, the shape of which substantially corresponds to the peripheral configuration of the lower part of the frame 32, as can be seen from FIG. 6, which shows the frame 32 from beneath. The frame 32 and the rotor 22 mounted therein, together with associated components, can thereby be inserted into place in the housing 16 and fixed therein (see FIGS. 2 and 5).

Figure 3:
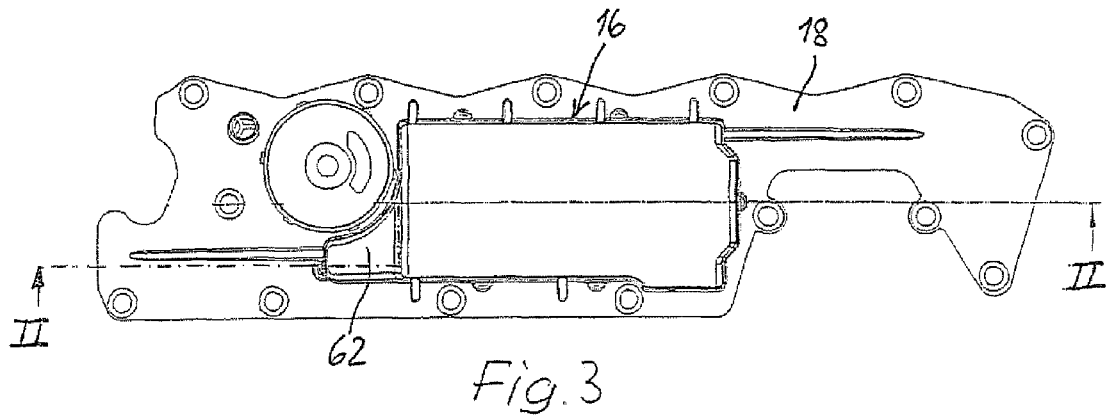
FIG. 3 is a plan view of the housing of the crankcase gas cleaner according to the invention.

The housing 16, as can best be seen from FIGS. 2 and 3, has a gas inlet 62 for untreated crankcase gas. The gas inlet 62 has a downstream opening 64, which adjoins the central inlet shaft 26 in the rotor 22, and a upstream opening 66, which is situated in an interface surface between the housing 16 and the valve cover 12 (see the opening 66 in the frame 32 in FIG. 6). The outlet duct 38 for cleaned crankcase gas in the first end piece 34 also communicates with a return line (not shown) for returning the cleaned gas to the engine fuel/air intake.

According to the preferred embodiment of the device according to the invention the rotor 22 is driven hydraulically by the turbine wheel 48 supported in the chamber 46 through the pressure of the engine lubricating oil system. For this purpose the turbine wheel 48 has an outlet nozzle 68 essentially directed tangentially, which is supplied with hydraulic oil via an inlet line 70, an axial pipe 72 and a radial duct 73 in the wheel 48. The inlet line 70 is suitably coupled via a connection 74 to a hydraulic oil circuit (not shown). The outlet nozzle 68 is suitably directed somewhat obliquely outwards from the radial plane and towards the inside of either one of the wall sections 40, 42 and its extension in the cover part 44, in order to moderate the oil spray which originates from the oil jet from the nozzle 68 when the wheel 48 rotates. The oil from the nozzle 68 can run back to the space under the valve cover 14 via openings 76 on the underside of the frame 32.

The device according to the invention functions as follows: on starting of the internal combustion engine 10, hydraulic oil flows into the turbine wheel 48 via the inlet line 70, the axial pipe 72 and the radial duct (not shown) in the wheel 48, thereby setting the rotor 22 of the centrifugal separator 14 in rapid rotation. At the same time hot crankcase gas mixed with oil particles flows via ducts up from the engine crankcase to the space under the valve cover 12, from where the gases are drawn directly into the central inlet shaft 26 of the rotor 22 via the opening 66, the inlet 62 and the opening 64. The rapid rotation of the rotor 22 forces the untreated crankcase gas out into the gaps between the adjoining conical separating discs 20, with the result that the oil particles in the gas will be caught by inward facing surfaces of the discs 20 before flowing out on these towards the periphery, where the collected oil particles and drops are then expelled towards the inside of the intermediate wall 52 and onto that part of the inside of the housing 16 not covered by this. The oil collected on the intermediate wall 52 and the housing wall then runs down into a schematically indicated collecting trough 78 in a space defined by the valve cover 12 via large oil outlet openings 80 in the frame 32, following which the oil can be returned to the engine lubricating oil circuit. Separated oil from the rotor 22 is also expelled directly down into the trough 78 from that part of the rotor 32 situated clear of the openings 80. The cleaned gas freed of oil particles, which flows out from the periphery of the rotor 22, can primarily flow out of the housing 16 via the spray-protected space between the intermediate wall 52 and the inside of the opposing part of the housing 16, from whence the gas can be led out via the outlet duct 38 in the first end piece 34 to the return line (not shown) to the fuel/air intake of the engine 10.

The arrangement according to the invention of an active centrifugal cleaner in a housing located on top of a corresponding opening in the valve cover of an internal combustion engine makes it possible, when starting in cold seasons of the year, to avoid the problem of condensation and blockages in the cleaner by achieving a rapid direct warming of the oil in the cleaner and components of the cleaner. Nor is it necessary to run external lines to and from the cleaner for delivering and removing crankcase gas and oil, which makes the design construction of the entire device more expensive and which may create problems when starting up at cold ambient temperatures. Components of the device, including its drive device, can easily be assembled in the form of modular units to form a unit which can be fitted directly to a connection on the valve cover.

Although in the preferred embodiment described the rotor 22 is hydraulically driven by a turbine wheel 48, it is possible, without departing from the scope of the invention, to use an electric motor instead. It should furthermore be possible, instead of truncated cone disc elements 20 in the rotor 22, to use multiple, essentially involute disc elements running axially.

The invention claimed is:

1. A device for cleaning crankcase gases from an internal combustion engine, the device comprising;
   a housing;
   a rotor rotatably mounted in the housing and having a plurality of tightly separated separating discs which define a central gas flow shaft in fluid communication with a gas inlet chamber which communicates with intervening spaces between the disc elements and with a cavity around the rotor defined by the housing; and
   a drive device to rotate the rotor;
   wherein the housing defines an inlet in the housing for crankcase gas, a gas outlet in the housing for cleaned crankcase gas, and an oil outlet in the housing for separated oil, and
   wherein the housing has an interface surface to be directly mounted to a valve cover of the internal combustion engine, such that the inlet in the housing has a downstream opening, which communicates with the gas inlet chamber, and an upstream opening, which is situated in the interface surface and which by way of an opening in the valve cover communicates directly with the crankcase gas in a space defined by the valve cover, and
   an essentially semi-cylindrical intermediate wall that is arranged in the cavity between the rotor and a wall part of the housing remote from the valve cover, with a space between the intermediate wall and said wall part defining a shielded chamber communicating with the gas outlet in the housing.

2. The device as claimed in claim 1, wherein one end of the intermediate wall is integrally formed with an end wall in the form of a truncated cone, the center of which coincides with the central axis of the rotor.

3. The device as claimed in claim 1, wherein the rotor is rotatably supported in a separate frame that is detachably mounted into the cavity of the housing.

4. The device as claimed in claim 3, wherein the separate frame has one or more openings, which coincide with the oil outlet, and the oil outlet is situated in the interface surface of the housing, the oil outlet to discharge separated oil into an oil collecting trough in a space defined by the valve cover.

5. The device as claimed in claim 3, wherein the separate frame has an end piece, which defines a gas outlet duct, which communicates with the shielded chamber in the housing, the gas outlet duct in communication with the gas outlet.

6. The device as claimed in claim 3, in which the drive device consists of a hydraulically driven turbine wheel, which is coupled to a drive shaft connected to the rotor, wherein the turbine wheel is supported in a turbine housing integrally formed with a separate frame.

7. The device as claimed in claim 6, wherein the turbine housing has at least one opening, which coincides with an opening, situated in the interface surface of the housing to discharge the turbine-driven oil into an oil collecting trough in a space defined by the valve cover.

8. The device as claimed in claim 6, wherein an axial duct at the center of the turbine wheel communicates with an oil outlet nozzle, essentially directed tangentially at the periphery of the turbine wheel, and with an oil feed duct, which is connected to an ordinary pressurized lubricating oil circuit of the engine.

9. The device as claimed in claim 8, wherein the oil outlet nozzle essentially directed tangentially is also directed at an angle away from the plane of the turbine wheel.

10. The device as claimed in claim 6, wherein the turbine housing is defined by an end piece of the separate frame, which is situated opposite a further end piece of the separate frame defining a gas outlet duct that is in communication with the gas outlet.

11. The device as claimed in claim 1 wherein the drive device comprises an electric motor, which is mounted outside the housing and which is coupled to a drive shaft connected to the rotor.

12. The device as claimed in claim 1 wherein the separating discs of the rotor have the shape of truncated cone disc elements.

13. The device as claimed in claim 1 wherein the separating discs of the rotor have the shape of essentially involute axial discs.

* * * * *